United States Patent
Calman et al.

(10) Patent No.: US 9,026,461 B2
(45) Date of Patent: May 5, 2015

(54) ENHANCED MOBILE APPLICATION FOR ASSISTING USERS AT A POINT OF TRANSACTION

(75) Inventors: Matthew A. Calman, Charlotte, NC (US); Erik Stephen Ross, Charlotte, NC (US); Susan Smith Thomas, Gastonia, NC (US); Jooyong Lee, Silver Spring, MD (US); Zhenshuo Fang, San Francisco, CA (US); James Mulholland, San Francisco, CA (US); Brendan Kiu, Sunnyvale, CA (US); Nastasha Tan, Torance, CA (US)

(73) Assignee: Bank of America Corporation, Charlotte, NC (US)

( * ) Notice: Subject to any disclaimer, the term of this patent is extended or adjusted under 35 U.S.C. 154(b) by 31 days.

(21) Appl. No.: 13/355,900

(22) Filed: Jan. 23, 2012

(65) Prior Publication Data
US 2013/0191232 A1    Jul. 25, 2013

(51) Int. Cl.
G07F 19/00    (2006.01)
G07F 9/02    (2006.01)
G09B 21/00    (2006.01)

(52) U.S. Cl.
CPC .............. *G07F 19/201* (2013.01); *G07F 9/023* (2013.01); *G09B 21/001* (2013.01)

(58) Field of Classification Search
CPC ... G06Q 20/20; G06Q 20/206; G06Q 20/202; G06Q 20/204; G06Q 20/322
USPC ......................................................... 705/18
See application file for complete search history.

(56) References Cited

U.S. PATENT DOCUMENTS

| | | | |
|---|---|---|---|
| 2006/0136901 A1* | 6/2006 | Nichols ......................... | 717/169 |
| 2006/0165060 A1* | 7/2006 | Dua .............................. | 370/352 |
| 2011/0112918 A1* | 5/2011 | Mestre et al. ................... | 705/16 |
| 2011/0302083 A1* | 12/2011 | Bhinder ......................... | 705/44 |
| 2012/0022944 A1* | 1/2012 | Volpi ........................ | 705/14.53 |
| 2012/0143706 A1* | 6/2012 | Crake et al. ..................... | 705/18 |
| 2012/0158589 A1* | 6/2012 | Katzin et al. .................... | 705/44 |
| 2012/0185398 A1* | 7/2012 | Weis et al. ....................... | 705/75 |

OTHER PUBLICATIONS

Wagner, Michael Andrew. Conversations About Technology. University of Wisconsin Madison, 2012.*

* cited by examiner

*Primary Examiner* — Florian Zeender
*Assistant Examiner* — Fawaad Haider
(74) *Attorney, Agent, or Firm* — Michael A. Springs; Moore & Van Allen PLLC; Nicholas C. Russell

(57) ABSTRACT

Embodiments of the invention include systems, methods, and computer-program products that provide for an enhanced mobile application for assisting users at a point-of-transaction (POT). In one embodiment of the invention the POT assistance application program may determines that a user is conducting a transaction with a merchant. The user may utilize a user device to assist in the transaction. First, the user device may be paired with a POT system, such as a cash register. Once the devices are paired a communication link is created that allows the user to audibly and/or visually monitor the transaction using the user device. Furthermore, the user may flag an item for review during the transaction, silence the transaction, receive a subtotal for the transaction, select a payment method, or complete the transaction using the POT assistance application program.

18 Claims, 7 Drawing Sheets

ENHANCED MOBILE APPLICATION FOR ASSISTING USERS AT A POINT OF TRANSACTION

BACKGROUND

Currently, individuals conduct transactions using a payment means such as credit cards, debit cards, cash, and/or checks. Typically, individuals will monitor the transaction and once a total price for the transaction is displayed to the individual, he/she may utilize a point-of-transaction device to complete the transaction. In some cases, the individual may need to provide sensitive information, such as a pin number, last four digits of a credit card, birthdate, social security number or the like to the merchant, either audibly or by utilizing the point-of-transaction device in order to complete the transaction.

However, some individuals may not be able to monitor the transaction. For example, visually impaired individuals may be unable to visually monitor the items being scanned during a transaction, such as at a grocery store check-out or the like. Without being able to observe the items being scanned, visually impaired individuals may be unable to determine that the item being scanned is the item that was intended to be purchased.

Along with not being able to visually monitor the transaction, visually impaired individuals and other individuals may be limited in their ability to provide sensitive information to the merchant's point-of-transaction device. This is largely due to point-of-transaction devices, e.g., cash registers, not being uniform across different stores or even uniform for different transactions. Therefore, visually impaired individuals are limited in their ability to apply knowledge of one point-of-transaction device to another point-of-transaction device, or in some instances even locate the point-of-transaction device at the point-of-transaction location. Although, individuals may be able to audibly provide the sensitive information that may be otherwise provided via a point-of-transaction device, many may not wish to do so because of the potential for identity theft.

Therefore, a need exists to provide visually impaired individuals and other individuals with improved point-of-transaction experience for individuals that may not be able to monitor the transaction or may not wish to provide sensitive information to the merchant via conventional point-of-transaction or audible means.

BRIEF SUMMARY

Embodiments of the present invention address the above needs and/or achieve other advantages by providing apparatuses (e.g., a system, computer program product and/or other devices) and methods for an enhanced mobile application for assisting users at a point-of-transaction (POT).

The following U.S. patent applications are filed concurrently with the present application and are hereby incorporated by reference: U.S. patent application Ser. No. 13/355,191 to Calman et al. and entitled "Controlling a Transaction with Command Gestures" and U.S. patent application Ser. No. 13/355,886 to Calman et al. and entitled "Shopping Plan Optimization."

Embodiments of the present invention provide for an enhanced mobile application for assisting users at a POT. In some embodiments, first the system may receive an indication that a user has activated the POT assistance application. The POT assistance application may be activated in several ways including, but not limited to a communication with a near-field communication (NFC) access token and/or the like. Once the POT assistance application has been activated, the system may provide an authorization request to the user device.

In some embodiments, the system may receive authorization that the user is located at a POT, as such the POT assistance system may provide communication between the POT. This communication may provide audio and/or visual indications as to the transaction, so that the user may monitor the transaction. For example, the communication may provide audio through the user device as to each product the user is purchasing at the merchant and the price of that product.

In some embodiments, the POT assistance system may allow the user to flag specific communication segments, such as a particular product purchases out of a plurality of products purchased, to discuss the purchase, price, product, etc. with the merchant at the end of the transaction. Prior to completing the transaction, the POT assistance system may allow a user to select a payment device from a plurality of payment options available to the user. Finally, the POT assistance system may provide the selected payment device for payment for the transaction using the selected payment device.

Embodiments of the invention relate to systems, methods, and computer program products for assisting a user at a point-of-transaction comprising: receiving an indication that the user is initiating a transaction using a mobile device, wherein the indication activates a mobile application; providing an authorization request to the mobile device, wherein the mobile device is paired with a point-of-transaction device to confirm authorization; linking the mobile application with the point-of-transaction, wherein the linking is based at least in part on the confirmed authorization; communicating, via a computing device processor, the transaction to the user; allowing communication segments to be flagged based at least in part on the communication of the transaction to the user; and providing a plurality of payment options to the user for payment for the transaction.

In some embodiments, receiving an indication that the user is initiating a transaction using the mobile device further comprises receiving a near-field communication to activate a mobile application. Activating the mobile application via near-field communication is based on a near-field communication access token initiating the activation. In some embodiments, providing an authorization request further comprises providing a barcode to the mobile device, wherein the barcode is scanned at the point-of-transaction to confirm authorization.

In some embodiments, the linking of the mobile application with the point-of-transaction further comprises linking the mobile device and the point-of-transaction device communicably.

In some embodiments, communicating the transaction to the user further comprises providing an audible indication of the transaction to the user. Communicating the transaction to the user may further comprise providing a visual indication of the transaction to the user. Communicating the transaction to the user may still further comprise providing a visual indication of the transaction to the user, via the mobile device. Communicating the transaction to the user further comprises providing indications as to each product being purchased during the transaction and the price of the product.

In some embodiments, the invention further comprises providing a selected payment device from the plurality of payment options to the point-of-transaction to complete the transaction. In some embodiments, the user is allowed to navigate the mobile application using command gestures. In yet other embodiments, audible notification of the initiation and completion of the transaction are provided to the user.

In some embodiments, allowing communication segments to be flagged further comprises allowing the user to flag segments of the communication of a transaction for further investigation of the product associated with that segment of the communication.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
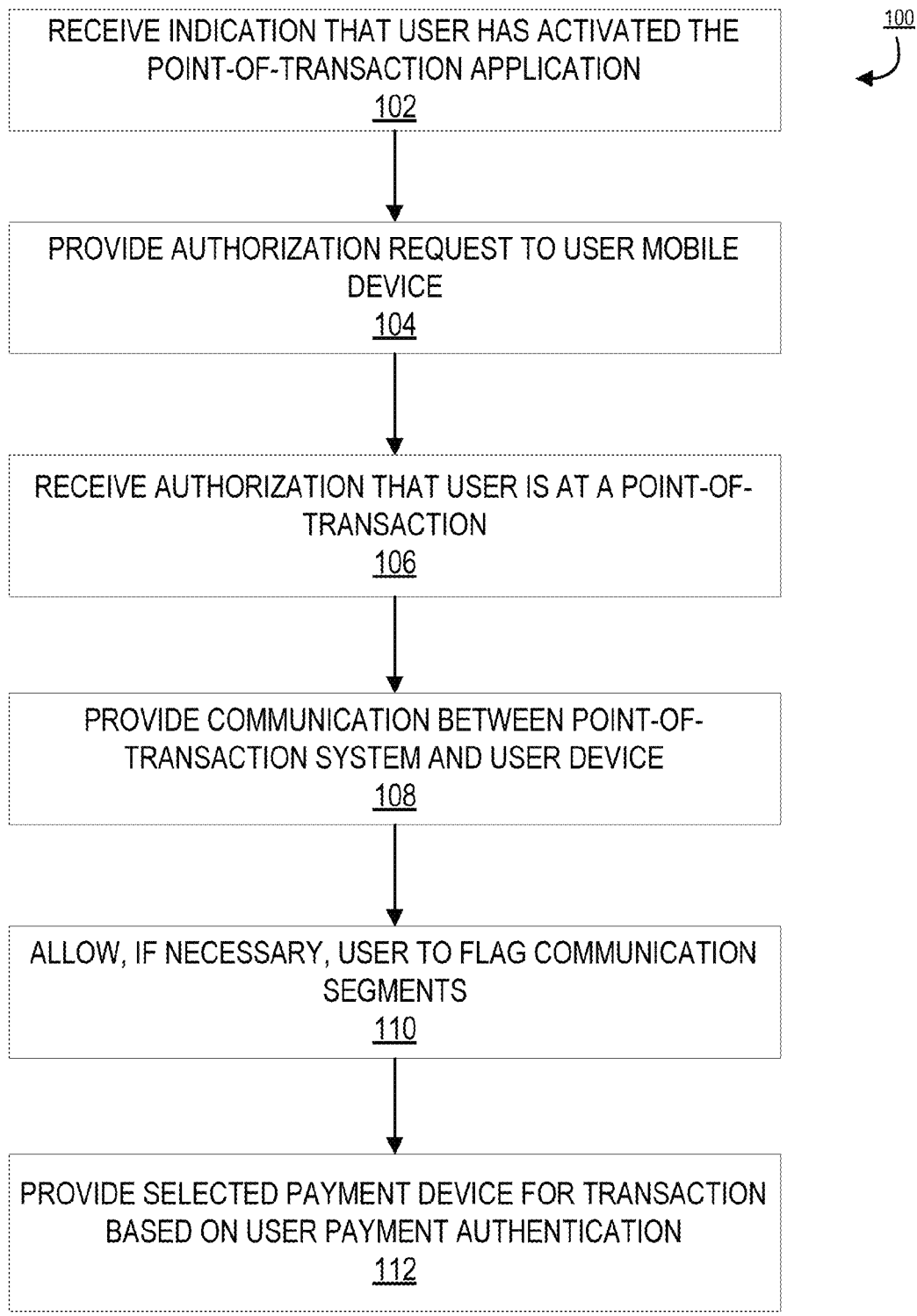
Figure 2:
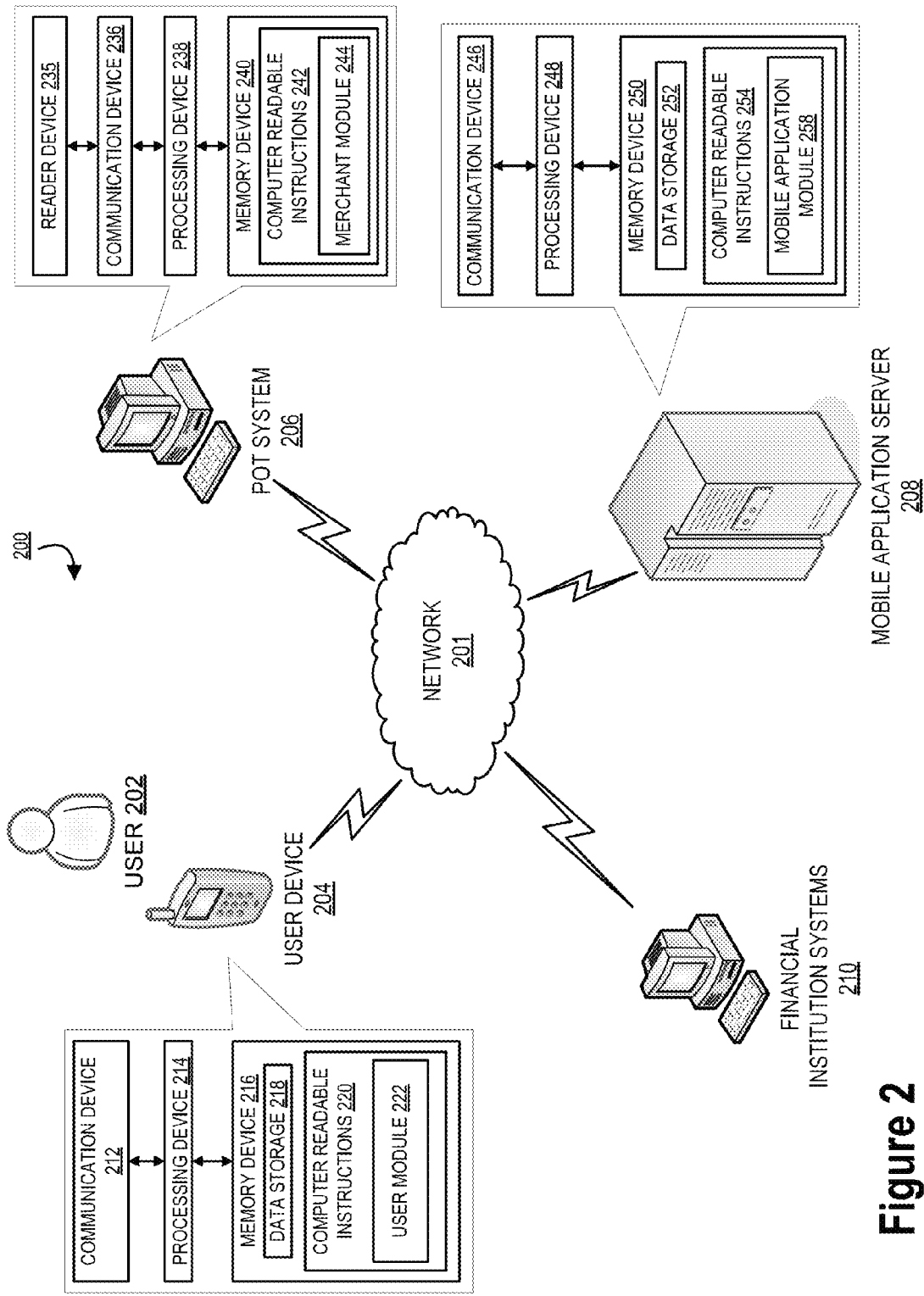
Figure 3:
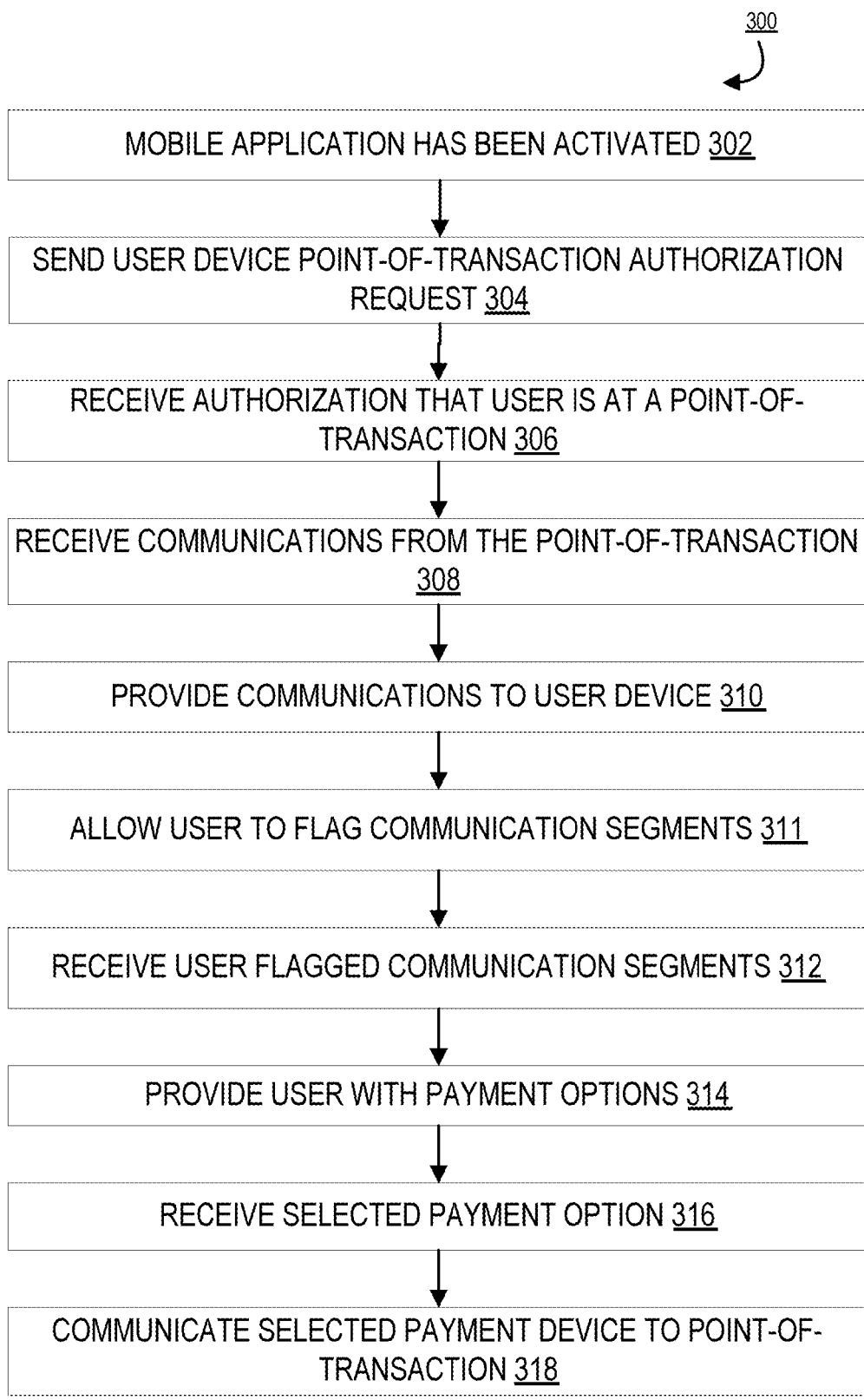
Figure 4:
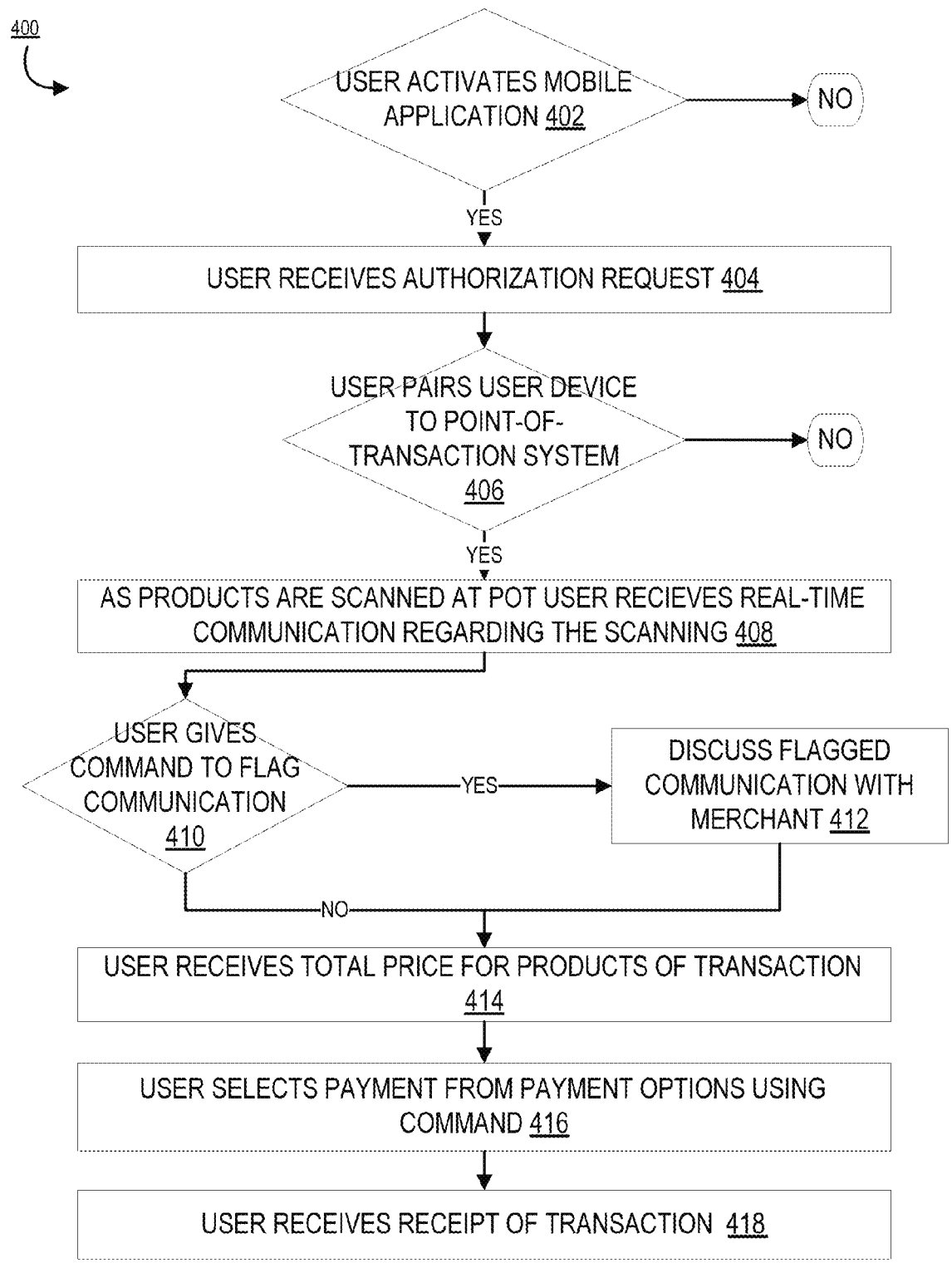
Figure 5:
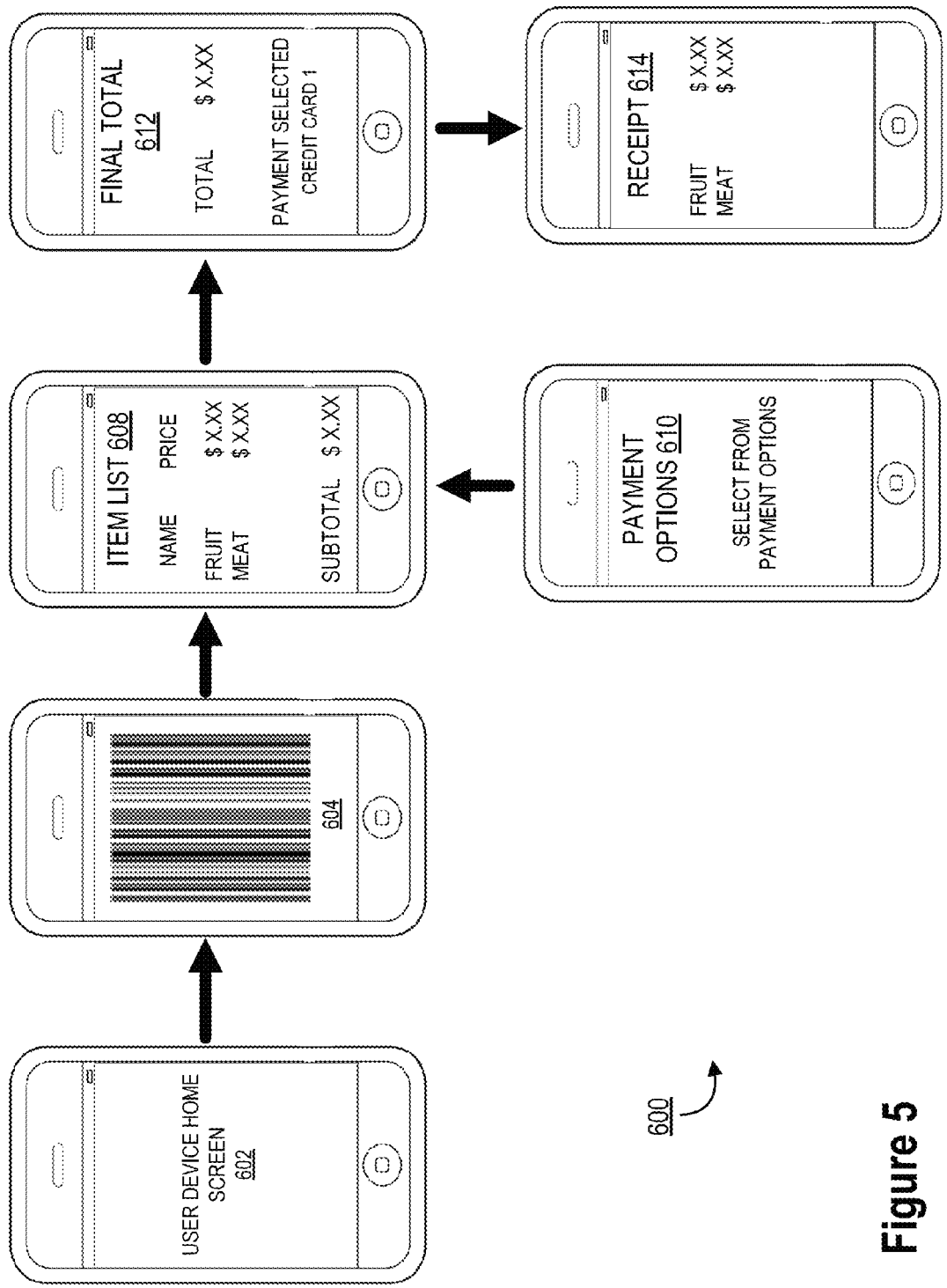
Figure 6:
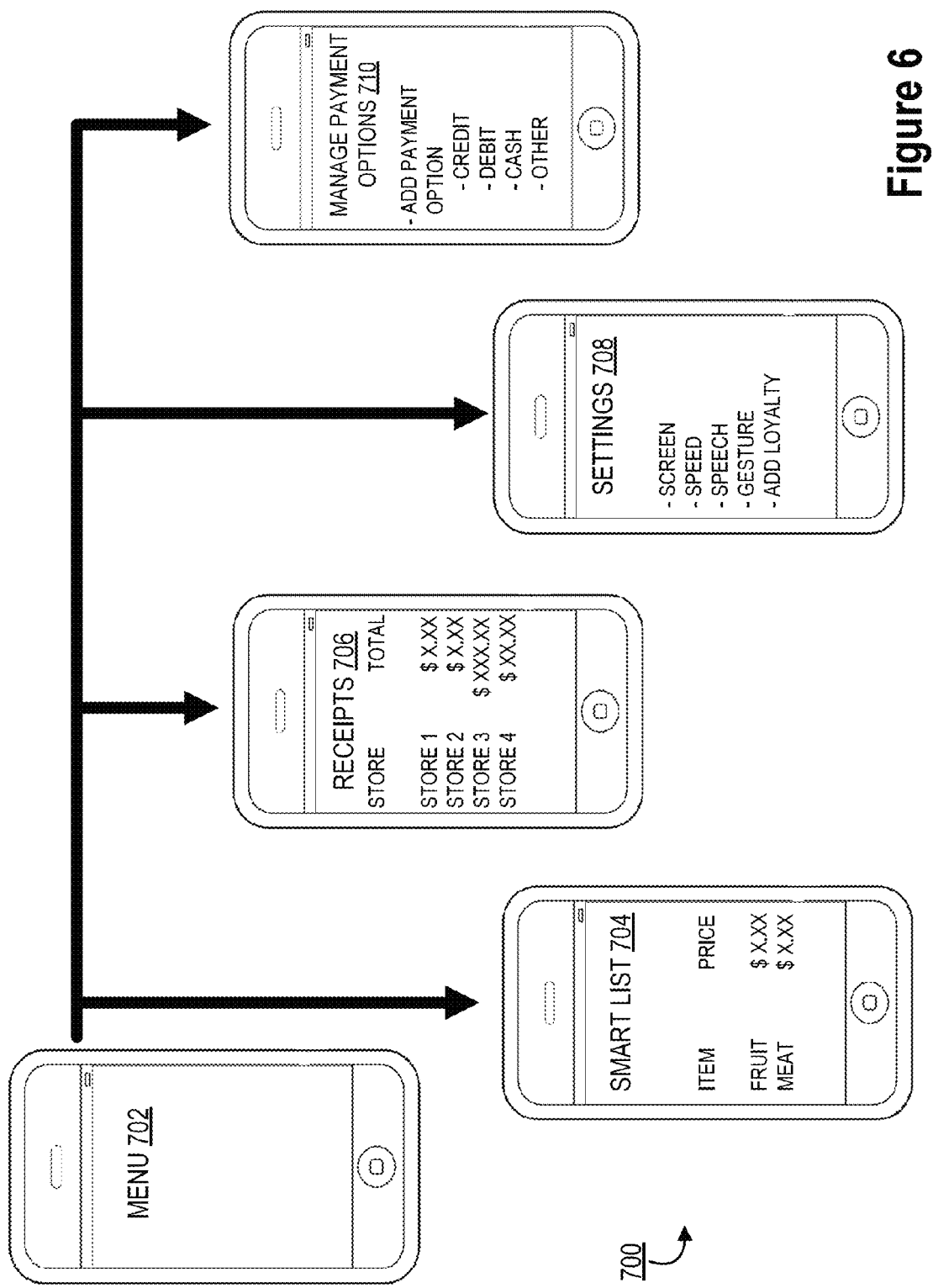

Having thus described embodiments of the invention in general terms, reference will now be made to the accompanying drawings, wherein:

FIG. 1 provides a high level process flow illustrating a point-of-transaction assistance application process for providing assistance to users at a point-of-transaction, in accordance with one embodiment of the present invention;

FIG. 2 provides a point-of-transaction assistance system environment, in accordance with one embodiment of the present invention;

FIG. 3 provides a point-of-transaction assistance application process flow, in accordance with one embodiment of the present invention;

FIG. 4 provides a process map illustrating a point-of-transaction assistance application user process, in accordance with one embodiment of the present invention;

FIG. 5 provides a user mobile device interface process, in accordance with one embodiment of the present invention;

FIG. 6 provides a user device interface menu, in accordance with one embodiment of the present invention; and FIGS. 7a-7e provide various commands associated with the point-of-transaction assistance application, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. A "merchant" as used herein may refer to a manufacturer, retailer, service provider, event provider, warehouse, supplier, and/or the like. Furthermore, as used herein, the term "product" shall mean any good, service, event, etc. that may be offered by a merchant.

Further, the embodiments described herein may refer to use of a transaction or transaction event to trigger the point-of-transaction (POT) assistance application program. Unless specifically limited by the context, a "transaction" refers to any communication between the user and a merchant, financial institution, or other entity. For example, in some embodiments, a transaction may include one or more of the following: purchasing, renting, leasing, bartering, selling, and/or leasing goods and/or services (e.g., groceries, stamps, tickets, DVDs, vending machine items, etc.); withdrawing cash; making payments to creditors (e.g., paying monthly bills; paying federal, state, and/or local taxes and/or bills; etc.); sending remittances; transferring balances from one account to another account; loading money onto stored value cards (SVCs) and/or prepaid cards; donating to charities; and/or the like. For example, a transaction may occur when a user purchases a product at a merchant. In yet other embodiments, for example, a transaction may occur when an entity associated with the user is alerted. A transaction may occur when a user accesses a building, uses a rewards card, and/or performs an account balance query. A transaction may occur as a user's device establishes a wireless connection, such as a Wi-Fi connection, with a point-of-transaction terminal.

In still further embodiments, a transaction may refer to an event and/or action or group of actions facilitated or performed by a user's device, such as a user's mobile system, a merchant system, and/or a combination thereof. A device capable of facilitating or performing a transaction may be referred to herein as a "POT system" or "POT device." A "point-of-transaction" or "POT" could refer to any location, virtual location or otherwise proximate occurrence of a transaction. A POT system may refer to any device used to perform a transaction, either from the user's perspective, the merchant's perspective or both. In some embodiments, the POT system refers only to a user's system, in other embodiments it refers only to a merchant system, and in yet other embodiments, it refers to both a user device and a merchant device interacting to perform a transaction. For example, in one embodiment, the POT system refers to the user's mobile device configured to communicate with a merchant's system, whereas in other embodiments, the POT system refers to a merchant's system configured to communicate with a user's mobile device, and in yet other embodiments, the POT system refers to both the user's mobile device and the merchant's system configured to communicate with each other to carry out a transaction.

In some embodiments, a POT system is or includes an interactive computer terminal that is configured to initiate, perform, complete, and/or facilitate one or more transactions. A POT system could be or include any device that a user may use to perform a transaction with an entity, such as, but not limited to, an ATM, a loyalty device such as a rewards card, loyalty card or other loyalty device, a magnetic-based payment device (e.g., a credit card, debit card, etc.), a personal identification number (PIN) payment device, a contactless payment device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, MP3 device, personal GPS device, etc.), a merchant terminal, a self-service machine (e.g., vending machine, self-checkout machine, etc.), a public and/or business kiosk (e.g., an Internet kiosk, ticketing kiosk, bill pay kiosk, etc.), a gaming device, and/or various combinations of the foregoing.

In some embodiments, a POT system is operated in a public place (e.g., on a street corner, at the doorstep of a private residence, in an open market, at a public rest stop, etc.). In other embodiments, the POT system, is additionally or alternatively operated in a place of business (e.g., in a retail store, post office, banking center, grocery store, factory floor, etc.). In accordance with some embodiments, the POT system is not owned by the user of the POT system. Rather, in some embodiments, the POT system is owned by a mobile business operator or a POT operator (e.g., merchant, vendor, salesperson, etc.). In yet other embodiments, the POT system is owned by the financial institution offering the POT system providing functionality in accordance with embodiments of the invention described herein.

Some portions of this disclosure are written in terms of a financial institution providing the POT assistance application. It is understood that the invention is meant to provide some form of an assistance application for use by users to assist the user at a POT. The provider of the POT assistance application should not be limited to a financial institution, but instead include any institution that may be in a position to provide assistance to users at a POT.

FIG. 1 provides a high level process flow illustrating a point-of-transaction assistance application process for providing assistance to users at a point-of-transaction 100, which will be discussed in further detail throughout this specification with respect to FIGS. 2 through 7e. The first step in the process 100, as illustrated in block 102 the system may receive an indication that the user has activated the POT assistance application. The POT assistance application may be activated in several ways, include tapping the user's mobile device, a communication with a near-field communication (NFC) access token, user voice command, user gesture, personal identification number ("PIN") input, and/or the like. Once the POT assistance application has been activated, the system may provide an authorization request to the user device, such as a user's mobile device, as illustrated in block 104. The authorization request may be in the form of a bar code, PIN number, password, and/or the like that the user may present to the POT, such as at a merchant check-out kiosk.

At this point, the system may receive authorization that the user is located at a POT, as illustrated in block 106. The authorization may be done using near field communication, touch, voice, PIN input, mat activation, and/or other means that may minimize actions that must be performed by the user. The POT assistance system may provide communication between the POT, such as at a merchant POT device, and the user device, as illustrated in block 108. This communication may provide audio and/or visual indications as to the transaction, such that the user may monitor the transaction. For example, the communication may provide audio through the user device as to each product the user is purchasing at the merchant and the price of that product. In another example, the communication may check the products on a pre-established list created by the user, such that the communication may audibly and/or visually provide an indication to the user if the user is purchasing a product not on the pre-established list. In some embodiments, the POT assistance system may allow the user to flag specific communication segments, such as a particular product purchases out of a plurality of products purchased, to discuss the purchase, check a pre-established list, discuss the price, product, etc. with the merchant at the end of the transaction, as illustrated in block 110. Prior to completing the transaction, the POT assistance system may allow a user to select a payment device from a plurality of payment options, such as, but not limited to credit cards, debit cards, cash, mobile wallet payments, check, etc. Finally, as illustrated in block 112, the POT assistance system provides the selected payment device from the plurality of payment device options based on the user authenticating payment for completion of the transaction using the selected payment device. Completing the transaction may also require an authorization from the user, such as utilizing a near field communication, voice activation, signature, and/or the like such that the user may complete the transaction using the POT assistance system.

FIG. 2 provides a POT assistance system environment 200, in accordance with one embodiment of the present invention.

As illustrated in FIG. 2, the mobile application server 208 is operatively coupled, via a network 201 to the user device 204, to the POT system 206, and to financial institution systems 210. In this way, the mobile application server 208 can send information to and receive information from the user device 204, the POT system 206, and the financial institution systems 210 to provide an enhanced mobile application for assisting users at a POT. FIG. 2 illustrates only one example of an embodiment of a POT assistance system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the user 202 is an individual making a transaction, such as a financial transaction. The transaction may be made at a POT system 206 of a merchant, online or offline, at the merchant's place of business and/or other transaction means. The purchase may be made by the user 202 using a user device 204, such as a mobile device, mobile wallet (e.g. smart phone, PDA, etc.) or other types of payment system that may communicate with POT system 206 and/or financial institution systems 210 to allow the user 202 to complete a transaction. In other embodiments, the user 202 may enter into transactions by communicating with the POT system 206 or mobile application server 208 a payment device for the transaction. In some embodiments, the communication may occur via stored magnetic information, digital information, or other like payment device that stores information that may be transferred to a POT system 206 and/or a mobile application server 208 to allow a user 202 to enter into a transaction, such as a credit card, debit card, gift card, and/or the like. Furthermore, in some embodiments, the user 202 may be a merchant or a person, employee, agent, independent contractor, etc. acting on behalf of the merchant to enter into a transaction.

As illustrated in FIG. 2, the mobile application server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the POT system 206, the user device 204, and the financial institution systems 210. As such, the communication device 246 generally comprises a modem, server, or other device for communicating with other devices on the network 201.

As further illustrated in FIG. 2, the mobile application server 208 comprises computer-readable instructions 254 stored in the memory device 250, which in one embodiment includes the computer-readable instructions 254 of a mobile application module 258. In some embodiments, the memory device 250 includes data storage 252 for storing data related to the mobile application module 258 including but not limited to data created and/or used by the mobile application module 258.

In the embodiment illustrated in FIG. 2 and described throughout much of this specification, the mobile application module 258 allows the user 202 to interact with the system. Specifically, the mobile application module 258 allows a user 202 to communicate, via the user device 204 with a POT system 206 in order to provide the user 202 with a POT assistance application. In this way, the mobile application module 258 provides, in some embodiments, for activating the POT assistance application, providing and confirming authorizing of a potential communication between the user device 204 and the POT system 206, facilitating a communicate transaction data between the POT system 206 and the user device 204, recognizing user 202 commands, providing available user 202 payment options, authorize payment device selected, and providing mobile application menu options.

In some embodiments, the mobile application module 258 may allow for activation of the POT assistance application. The mobile application module 258 may activate the POT assistance application in several ways, including but not limited to touch, voice, PIN, near field communication, gesture, and/or the like activation. Some of the ways of activating the POT assistance application are further illustrated below with respect to FIG. 7a-7e. In some embodiments, the mobile application module 258 may recognize a near field communication ("NFC") access token to activate the POT assistance application, such as that illustrated in FIG. 7a. In this way, the NFC access token may be touched to the user device 204 to activate the POT assistance application. The NFC access token may also be used for authentication and completing the transaction. In other embodiments, the user 202 may activate the POT assistance application based on a user 202 communication or command. For example, the POT assistance application may be activated by selecting the POT assistance application on a user device 204, user 202 provided gestures, voice commands, and/or any other means that may activate the POT assistance application. In most of these embodiments, the POT assistance application may be activated minimizing the activities by the user, making activation easy for a visually impaired or low visioned individual. Selecting the POT assistance application on a user device 204 may comprise touching an application icon on the user device 204, selecting a key on the user device 204, by a mouse selection tool, and/or any other means of selecting the POT assistance application for activation on a user device 204. A gesture may include a user 202 movement of the user device 204 in a specific motion, as further illustrated in U.S. patent application Ser. No. 13/355,191 to Calman et al. and entitled "Controlling a Transaction with Command Gestures" filed concurrently with the present application. The activation of the POT assistance application may require communication between the mobile application module 258 and the other devices of the system. The mobile application module 258 may communicate via the communication device 246 of the mobile application server 208 through a network 201 to the other devices on the system, such as, but not limited to the user device 204, the financial institution systems 210, and the POT system 206.

Next, the mobile application module 258 provides an authorization request to the user device 204. In this way, the authorization request ensures that the user 202 is located near a POT or POT system 206. For example, the mobile application module 258 may send a unique code identification to the user device 204 to communicate that with the POT system 206. At that point, either the user device 204 and/or the POT system 206 may communicate via the network, back to the mobile application module 258 that a user 202 is located near a POT or POT system 206 and is wishing to enter into a transaction at the merchant of the POT. Unique code identifications may include, in some embodiments, barcodes, various universal product codes (UPC codes), numbers associated with a UPC code, QR codes, and/or the like. In some embodiments, the barcode and/or UPC code may comprise a 12 digit code and include between a 6 to 10 digit company prefix. The authorization request may comprise UPC codes such as those assigned by the GS1 US (formerly the Uniform Code Council) and/or the like.

The user device 204 may communicate the unique code identification associated with the authentication request to the POT system 206. For example, if the unique code identification is a barcode and/or UPC code, the code may be displayed on the user device 204. The user 202 may provide the user device 204 to the merchant. The merchant may then scan the UPC code on the user device 204 using the POT system 206. Once the POT system 206 has scanned the UPC code, the authorization request has been completed and the user device 204 and/or the POT system 206 may then provide a completed response to the authorization request to the mobile application module 258. In some embodiments, the authorization may be a wireless communication between the POT system 206, the user device 204, and/or the mobile application module 258. In this way, the user 202 may not be required to provide a unique code to the POT, but instead it may be done automatically.

In some embodiments, the authorization may include setting the user device 204 on a recognition surface, such as a mat. In this way, the user device 204 may be in contact with a mat or other surface at the POT that may authorize that the user 202 is at the POT. The mat or other recognition surface may be associated with the POT system 206, the merchant, the mobile application server 208 such that the mobile application module 258 may recognize that the user 202 via the user device 204 is attempting to transact with a merchant at a POT, thus allowing the transaction to continue.

Once the completed response to the authorization request is sent to the mobile application module 258 the authorization request may be confirmed by the mobile application module 258. The confirmed authorization request confirms that the user 202 is in communication with a merchant and is wishing to transact with that merchant, such that an encrypted connection may be made between the user device 204 and the other devices on the system. The confirmed authorization request allows the mobile application module 258 to provide a communication link between the POT system 206 and the user device 204. In some embodiments, this may enable the POT system 206 to communicate directly with the user device 204. In other embodiments, this may enable the mobile application module 258 to communicate between the POT system 206 and the user device 204.

Next, the mobile application module 258 provides for facilitating communication between the POT system 206 and the user device 204. In some embodiments, the mobile application module 258 may allow the POT system 206 to communicate directly with the user device 204. In other embodiments, the mobile application module 258 may communicate with the POT system 206 and the user device 204 to provide the same communications indirectly. This communication allows for the terms of the transaction and/or the transaction itself to be communicated to the user 202. The communication of the transaction to the user 202 may include audio and/or visual indications as to the transaction, such that the user 202 may monitor the transaction. For example, if the user 202 is purchasing several items at a grocery store POT, each time a product is scanned at the POT, the POT system 206 may communicate either directly or indirectly with the user device 204 to allow the user device 204 to either audibly and/or visually provide the user 202 with an indication as to the type and price of each product that is scanned during the transaction. In other embodiments, the communication may include audio and/or visual indications as to the transaction based on a pre-determined list, such as a smart list, as illustrated further below with respect to FIG. 6. In this way, the user 202 may be provided an indication as to whether a product purchased during the transaction is or is not a part of the pre-determined smart list. In this way, during the transaction a communication may indicate products that the user 202 did not have on his/her pre-determined smart list. Therefore, a user 202 may know what products he/she is purchasing that are not on his/her list. In another example, the communication may also provide the user an indication as to the products on his/her list that he/she did not purchase. For example, if the user 202 has milk on his/her list, but does not purchase milk during the transaction, prior to the end of the transaction the system may notify the user 202 that he/she did not purchase a product on the smart list. In yet other embodiments, the communication may also provide a price different between products on the smart list and the product being purchased. For example, if the user 202 has previously purchased Brand A cereal for price A, the system may communicate to the user 202 if the Brand A cereal he/she is currently purchasing is at a different price, price B.

Allowing a user 202 to either audibly and/or visually monitor the transaction based on the communication between the user system 204, POT system 206, and the mobile application server 208, may also allow a user 202 to flag a segment of the communication for later review. In this way, the POT assistance system may allow the user 202 to flag specific communication segments, such as a particular product purchases out of a plurality of products purchased to discuss the purchase, price, product, etc. with the merchant at the end of the transaction. Flagging a segment of the communication of the transaction to a user device 204 may be done in several ways, including but not limited to, voice flagging, gesture flagging, touch flagging, and/or other means of a user 202 notifying a user device 204 that the communication segment has been flagged for later review.

Next, the mobile application module 258 may recognize user 202 commands. User commands may include, but are not limited to, gestures, voice commands, text commands, mouse commands, keystroke commands, touch commands, and/or the like. In this way, if the user 202 gives a command to the user device 204 the mobile application module 258 may recognize the command and provide the necessary response to the command via the POT assistance application. In this way, the mobile application module 258 may communicate commands between the user 202 via the user device 204 to the mobile application server 208 and the other devices on the system 200, such as, but not limited to the POT system 206, the mobile application server 208, and the financial institution systems 210.

In some embodiments, the mobile application module 258 may provide available user 202 loyalty and/or payment options for payment of the transaction with a merchant at a POT. In some embodiments, the available user 202 loyalty options may include accessing the user's 202 loyalty account for the merchant that the user 202 is transacting with and automatically applying the loyalty account to the transaction. For example, if a user 202 is as loyalty member at the local grocery store, the system may recognize the POT the user 202 is currently transacting with, as the same local grocery store. In this way, the system may provide the merchant, through communication with the POT system 206 the user's 202 loyalty account information, such that the loyalty account may be applied to the current transaction.

In some embodiments, the available payment options include any payment device that the user 202 may be able to utilize, that the merchant may also accept. In this way, the payment options available to the user 202 may be limited by what payment devices the user 202 has enrolled in and what payment devices the merchant of the transaction may accept. The payment devices available to the user 202 include, but may not be limited to credit cards, debit cards, cash, mobile wallet, checks, lines-of-credit, etc. The payment devices may be determined by the mobile application module 258 based on manual input of the payment device by the user 202 into the user device 204 and subsequent communication of that manual input via a network 201 to the mobile application module 258. The manual input may include payment type (e.g. type of credit card, debit card, currency, etc.), account numbers, expiration date data, account holder name, and/or the like. The manual input may be inputted via an interface on the user device 204, such as those illustrated in FIG. 5 and FIG. 6. Once inputted, the payment options available to that particular user 202 may be stored in the memory device 250 of the mobile application server 208, such that the mobile application module 258 may provide the available payment options to the user 202 via the POT assistance application, upon the completion of a user 202 transaction.

In other embodiments, the available user 202 payment options may be provided to the mobile application module 258 via NFC capabilities. In this way, if the payment device is NFC capable, the user 202 may touch the payment device to the user device 204 such that the user device 204 may, utilizing the NFC capabilities, be able to retrieve information from the payment device that may be required of the user 202 to utilize the payment device in the future. The payment device that is provided via NFC capabilities of the user device 204 may be stored in the memory device 216 of the user device 204 as well as communicated to the mobile application module 258 for storage.

Furthermore, available user 202 payment options may be provided to the mobile application module 258 from financial institution systems 210. In this way, the financial institution system 210 may provide the mobile application module 258 with the payment options that the user 202 has available at that specific financial institution. In this way, the credit cards, debit cards, mobile wallet, checks, lines-of-credit, etc. the user 202 has with the financial institution of the financial institution system 210 may be provided by the financial institution system 210 to the mobile application module 258 via a network 201. At this point, the mobile application module 258 may store the payment devices in the memory device 250 of the mobile application server 208, such that the mobile application module 258 may provide the available payment options to the user 202 via the POT assistance application, upon the completion of a user 202 transaction. Therefore, the payment options may appear to the user 202 of the POT assistance application without the user 202 having to manually input the payment option information. In some embodiments, the mobile application module 258 may request user 202 payment options and the information associated with the payment options, such that a transaction may be competed using that payment option, from a financial institution system 210. In other embodiments, the mobile application module 258 may receive user 202 payment options and the information associated with the payment options, such that a transaction may be completed using that payment option from a financial institution system 210 without requesting the payment option data.

Once the user 202 payment options are presented to the user 202 via the user device 204, the user 202 may select a payment device from the payment options to use as payment for the transaction. The payment options may be presented via the POT assistance application though an interface, such as those illustrated in FIG. 5 and FIG. 6. The interface may be provided to the user 202 through a user device 204. The mobile application module 258 may, through the communication device 246 provide the interface to the user device 204 via a network 201.

Upon selection of the payment device from the payment options available to the user 202 for that transaction, the mobile application module 258 may authorize the transaction using that payment device. The user 202 may provide an indication of his/her authorization of the transaction using a specific payment device via his/her user device 204. The user 202 may indicate authorization of a payment device via NFC token, touch indication, voice indication, gesture indication, and/or the like on his/her user device 204. Some of these indicators are further illustrated in FIG. 7a-7e. In some embodiments, once the payment device has been selected by the user 202, the POT system 206 may receive the selected payment device from the user device 204, via the network 201. Subsequently, the POT system 206 may complete the transaction by ensuring the user 202 has been authorized by the financial institution to use the selected payment device. In this way, the POT system 206 may ensure authorization of using the payment device with the financial institution system 210, via communication using a network 201. In other embodiments, once the payment device has been selected by the user 202, the mobile application module 258 may receive the selected payment device from the user device 204, via the network 201. In this way, the mobile application module 258 may communicate, via a communication device 246 to the financial institution system 210 via a network 201, to ensure that the user 202 is authorized to complete the transaction utilizing the payment device provided.

Finally, upon payment for the products purchase and completion of the transaction, the mobile application module 258 may provide a termination response to the user 202. The termination response provides an audible, visual, or touch/feel indication that the transaction is complete and the POT assistance application is terminated. In this way, the user 202 is provided with added security and privacy by knowing when the POT assistance application is terminated.

As illustrated in FIG. 2 and described throughout the remainder of the specification, the mobile application module 258 may provide the user 202 via the user device 204 with POT assistance application menu options. POT assistance application menu options allow a user 202 to easily set-up and navigate the POT assistance application. The menu options provided by the mobile application module 258 include, but are not limited to smart lists, receipt storage, settings (e.g. screen, speed, speech, gesture, etc.), and managing payment options. The menu options may be provided via an interface at the user device 204. The menu options are further described below, with respect to FIG. 6.

In some embodiments, the mobile application module 258 may create and provide a user 202 with smart lists. The mobile application module 258 may generate a smart list by determining previous purchase history of the user 202, previous purchase patterns of the user 202, and/or user 202 pre-determined products. In this way, the mobile application module 258 may be able to predict products that a user 202 may wish to have on his/her shopping list. For example, if a user 202 has previously purchased Brand A laundry detergent every other week. The mobile application module 258 may recognize this pattern and subsequently add Brand A laundry detergent to the user's 202 smart list if it is the proper week. Furthermore, the user 202 may be able to input products into the smart list in order to later purchase those products at a merchant. For example, the user 202 may input a grocery list for him/her to purchase at the grocery store. The mobile application module 258 may then communicate the smart list via a network 201 to the user device 204, such that the smart list may appear as an interface on the user device 204. Furthermore, the communication with the user device 204 and the mobile application module 258 may also be based on the smart list and the products therein. For example, the audible and/or visual communication provided to the user 202 regarding the transaction may include only the products the user 202 is purchasing from the smart list or the audible and/or visual communication provided to the user 202 regarding the transaction may include only the products the user 202 is purchasing that are not on the smart list. The smart list interface is described in further detail below with respect to FIG. 6.

As illustrated in FIG. 2, the POT system 206 generally comprises a reading device 235, a communication device 236, a processing device 238, and a memory device 240. The reading device 235 is operatively coupled to the processing device 238, communication device 236, and the memory device 240. The POT system 206 may include a reader device 235 to receive payment account information from the user 202 through the user device 204, mobile application server 208, financial institution systems 210, and/or other potential user 202 payment devices. Such a reader device 235 may include, but is not limited to a magnetic strip reader, a barcode scanner, a radio frequency (RF) reader, a character recognition device, a magnetic ink reader, an NFC reading device, a processor for interpreting codes presented over an electrical or optical medium, a biometric reader, a wireless receiving device, and/or the like. In some embodiments, the reading device 235 receives information that may be used to identify the user's 202 payment account from a payment device and may communicate via the communication device 236 over a network 201, to other systems such as, but not limited to the mobile application server 208, financial institution systems 210, and/or the user device 204. As such, the communication device 236 generally comprises a modem, server, or other device for communicating with other devices on the network 201.

As further illustrated in FIG. 2, the POT system 206 comprises computer-readable instructions 242 stored in the memory device 240, which in one embodiment includes the computer-readable instructions 242 of a merchant application 244. A POT system 206 may refer to any device that may be configured to carry out a transaction.

In some embodiments, a POT system 206 is or includes an interactive computer terminal that is configured to initiate, perform, complete, and/or facilitate one or more transactions. A POT system 206 could be or include any means that a user 202 may use to perform a transaction with an merchant, such as, but not limited to, an ATM, a loyalty device such as a rewards card, loyalty card or other loyalty device, a magnetic-based payment device (e.g., a credit card, debit card, etc.), a personal identification number (PIN) payment device, a contactless payment device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, MP3 device, personal GPS device, etc.), a merchant terminal, a self-service machine (e.g., vending machine, self-checkout machine, etc.), a public and/or business kiosk (e.g., an Internet kiosk, ticketing kiosk, bill pay kiosk, etc.), a gaming device and/or various combinations of the foregoing.

In some embodiments, a POT system 206 is operated in a public place (e.g., on a street corner, at the doorstep of a private residence, in an open market, at a public rest stop, etc.). In other embodiments, the POT system 206 is additionally or alternatively operated in a place of business (e.g., in a retail store, post office, banking center, grocery store, factory floor, etc.). In accordance with some embodiments, the POT system 206 is not owned by the user of the POT system 206. Rather, in some embodiments, the POT system 206 is owned by a mobile business operator or a POS operator (e.g., merchant, vendor, salesperson, etc.). In yet other embodiments, the POT system 206 is owned by a financial institution offering the POT system 206 providing functionality in accordance with embodiments of the invention described herein.

The POT system 206 as discussed herein may include any point-of-transaction device, such as a cash register, ATM, smart phone, back end server of a merchant, etc. As such, the POT system 206 may be able perform a sale, an account balance check, a reward transfer, and account money transfer, a user 202 opening up a bank application on his mobile device or computer, a user 202 using his/her e-wallet, and/or the like.

In the embodiment illustrated in FIG. 2, the merchant application 244 allows the POT system 206 to be linked to the mobile application server 208 and other devices on the network 201 to communicate, via a network 201, the information related to the transaction being made, such as the transaction type, cost of transaction, product type, merchant location, user 202 location, etc. In this way, the merchant module 244 may provide confirmation authorization of a potential communication between the user device 204 and the POT system 206, communicate a transaction with the user device 204 either directly or indirectly, receive commands from a user 202, receive a payment device for payment for a transaction, and provide storable transaction information. In one example, the user 202 enters into a transaction at a POT system 206 of a merchant, which processes the transaction. The merchant module 244 may communicate the transaction, such as the products the user 202 is purchasing to the user 202. In some embodiments, the merchant module 244 may communicate the transaction to the mobile application server 208, which may, in turn provide the transaction communication to the user device 204. In other embodiments, the merchant module 244 may communicate the transaction to the user device 204. In this way, the user device 204 may display the products of the transaction, the price, and other aspects of the transaction either visually and/or audibly for the user 202 to review.

In some embodiment, the merchant module 244 may provide confirmation of authorization of a potential communication between the user device 204 and the POT system 206. In this way, the user 202 via the user device 204 may interact with the POT system 206 to ensure that the user 202 is wishing to enter into a transaction at the merchant's POT system 206. This interaction provides security functions, as well as initiating a transaction communication between the user system 204 and the devices on the system 200, such as, but not limited to the POT system 206, the mobile application server 208, and/or the financial institution systems 210. The security functionality of the merchant module 244 ensures that the user 202 is located near a POT or POT system 206 and wishing to initiate a transaction with the merchant. In this way, the merchant module 244 security functionality may prevent others from utilizing the POT assistance system 200 without the user's 202 knowledge.

The merchant module 244 may receive an authorization request from a user device 204. The authorization request may include providing a PIN number input, touch connection, and/or unique code identification. In some embodiments, the authorization request may be a touch connection that may include a mat located at the POT system 206 such that the user 202 may place the user device 204 on the mat to authorize that the user 202 is wishing to transact with the merchant. In some embodiments, the authorization request may provide a unique code identification such as a NFC token, voice, text, and/or the like to authorize the communication. The authorization request may be a unique code identification presented by the user device 204 to communicate that with the POT system 206. Unique code identifications may include, in some embodiments, various universal product codes (UPC codes), numbers associated with a UPC code, QR codes, and/or the like. In some embodiments, the UPC code may comprise a 12 digit code and include between a 6 to 10 digit company prefix. The authorization request may comprise UPC codes such as those assigned by the GS1 US (formerly the Uniform Code Council) and/or the like.

The unique code identification presented by the user device 204 may be identified by the merchant module 244 in several ways, including but not limited to the code identification being read by the reader device 235 of the POT system 206, the code identification being scanned by the reading device 235 of the POT system 206, the code identification being keyed into the POT system 206, and/or other ways to transmit the authorization request to the merchant module 244. For example, if the unique code identification is a UPC code, the code may be displayed on the user device 204. The user 202 may provide the user device 204 to the merchant. The merchant may then scan the UPC code on the user device 204 using the POT system 206.

Once the merchant module 244 has recognized the code identification presented to the POT system 206, the merchant module 244 may communicate the code identification to the mobile application server 208 to complete the authorization process. If the authorization is denied, the merchant module 244 may receive an indication from the mobile application server 208 of the denial and subsequently not authorize the transaction using the POT assistance system 200 for that transaction. If the authorization is accepted, communication between the user device 204 and the other devices on the system 200, such as the POT system 206 and the mobile application server 208 may be able to be performed freely during the transaction period. For example, once a UPC code has been scanned and the merchant module 244 has communicated with the mobile application server 208, such that authorization has been accepted, the merchant module 244 may then provide a communication link with the user device 204 either directly or indirectly.

The merchant module 244 may communicate a transaction with the user device 204, either directly or indirectly. In some embodiments, the communication link may enable the merchant module 244, through the communication device 236 to communicate directly with the user device 204. In other embodiments, the communication link may enable the merchant module 244, through the communication device 236 to communicate indirectly between the POT system 206 and the user device 204 by communicating with the mobile application server 208. This communication link allows the merchant module 244 to communicate for the terms of the transaction and/or the transaction itself to the user 202 either directly or indirectly. The merchant module 244 communication of the transaction to the user 202 may include audio and/or visual indications as to the transaction, such that the user 202 may monitor the transaction. For example, if the user 202 is purchasing several items at a grocery store POT, each time a product is scanned at the POT system 206, the merchant module 244 may communicate either directly or indirectly with the user device 204 to allow the user device 204 to either audibly and/or visually provide the user 202 with an indication as to the type and price of each product that is scanned at the POT system 206 during the transaction. In some embodiments, the communication may be based on the smart list of the user 202. In this way, the communication may include only the products the user 202 purchased that were on the smart list. In other embodiments, the communication may include only the products that the user 202 purchases that are not on the smart list. In yet other embodiments, the communication may include products that are on the smart list, but not purchased by the user 202, such that the user 202 may be notified of products on his/her list that he/she did not purchase.

In some embodiments, the merchant module 244 may allow the POT system 206 to receive commands from the user 202 through communication with the user device 204. Commands may be recognized by the merchant module 244 for several aspects of the POT assistance application, such as but not limited to receiving authorization of a potential communication, flagging a communication segment, authorizing a payment device for a transaction, and/or the like. These user 202 commands may include but not limited to, voice command, gesture command, touch command, and/or other means of a user 202 providing a command to the POT assistance system 200. Furthermore, some user 202 commands are further illustrated below with respect to FIG. 7a-7e. In this way, the merchant module 244 may recognize the command prior to the completion of the transaction and in some embodiments, notify the merchant of the user's 202 command, such that the merchant may be able to further aid the user 202 with completing the transaction.

As further illustrated in FIG. 2, the merchant module 244 may receive loyalty card information and/or payment device information for payment for a user 202 transaction. The loyalty card information may be automatically provided to the merchant if the user 202 has a loyalty account with that merchant. In this way, the user 202 may not have to find the loyalty card prior to the transaction, but instead the system may automatically provide the merchant POT with the loyalty card information for that purchase.

The payment device may be provided by the user device 204, the mobile application server 208, and/or the financial institution system 210. In this way, the merchant module 244 may receive payment from multiple sources for completion of a user 202 transaction. The payment devices that the merchant module 244 may be capable of receiving, includes, but is not limited to credit cards, debit cards, cash, mobile wallet, checks, gift cards, lines-of-credit, or other potential payment device that the merchant associated with the merchant module 244 may be able to accept. The merchant module 244 may receive the payment device that the user 202 desires to use to complete the transaction. In some embodiments, the merchant module 244 may receive the selected payment device from the user device 204 via communications over a network 201. In other embodiments, the merchant module 244 may receive the selected payment device from the mobile application server 208 via communications over a network 201. In this way, the merchant module 244 allows a user 202 to be able to never provide a physical payment device to the merchant (e.g. a credit card, debit card, check, cash, gift card, etc.), but instead, the payment device may be transmitted to the merchant module 244 of the POT system 206 from one or more of the other devices on the system 200. In this way, the merchant module 244 provides further security to the user 202, but ensuring that the user's 202 payment options are never publically visible. In yet other embodiments, the merchant module 244 may receive the payment device via the POT system 206 reader device 235. In this way, the reader device 235 may read the payment device, such as the magnetic strip on a credit card.

The payment device received by the merchant module 244 may also comprise data about the payment device. The data about the payment device allows the merchant module 244 to process the transaction with the financial institution providing the payment device. Therefore, the data about the payment device may include, but is not limited to an account number, credit card number, PIN number, personal identification number, security number, expiration data, routing number, user's 202 full name, user 202 date of birth, and/or the like that may be required by the merchant module 244 to process the payment for the transaction.

In some embodiments, the merchant module 244 may recognize that the user 202 has already authorized the transaction when the user 202 selected the payment device from the payment options available, utilizing the user device 204. In this way, the merchant module 244 may not require the user 202 to authorize the transaction (e.g. sign for the transaction payment to process, etc.). Instead, the merchant module 244 may send the payment device directly to the financial institution system 210 to complete the transaction. In some embodiments, the merchant module 244 may send the payment device to the financial institution system 210 using the communication device 236 via a network 201 for processing the transaction. In other embodiments, the merchant module 244 may send the payment device to the financial institution system 210 using the communication device 236 via a network 201 for security purposes, to ensure that the user 202 has been authorized by the financial institution to use the selected payment device.

Finally, the merchant module 244 may provide storable transaction information to the user device 204 and/or the mobile application server 208 for storage. Storable transaction information comprises information about the transaction, such as, but not limited to the products or services purchased via the transaction, the price of each product or service, the merchant location of the transaction, the time of the transaction, the date of the transaction, the payment device used for payment, or other information that may be included on a receipt for a transaction that a merchant may provide. The transaction information may be sent from the merchant module 244 once the user 202 has completed the transaction. In some embodiments the transaction information may be sent to the mobile application server 208 for storage in the memory device 250. In other embodiments the transaction information may be sent to the user device 204 for storage in the memory device 216. The transaction information may be sent from the merchant module 244 such that the user 202 may be able to search for the transaction information from that transaction at a later time using the POT assistance application. In this way, the user 202 may be able to receive stored transaction information, such as receipts, for previous transactions and may be able to select the prior transaction information in order to review the transaction and/or return a product or service purchased during that transaction. This is further illustrated below with respect to FIG. 6.

FIG. 2 also illustrates a user device 204. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the POT system 206, the mobile application server 208, and the financial institution systems 210. As such, the communication device 212 generally comprises a modem, server, or other device for communicating with other devices on the network 201.

As further illustrated in FIG. 2, the user device 204 comprises computer-readable instructions 220 stored in the memory device 216, which in one embodiment includes the computer-readable instructions 220 of a user module 222. In this way, the user module 222 allows a user 202 to access the POT assistance application, to communicate with a POT, to utilize gestures, to utilize audio and/or visual indications of the transaction, and to select a payment device from a plurality of payment options for a transaction. A "user device" 204 may be any mobile communication device, such as a cellular telecommunications device (e.g., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. Although only a single user device 204 is depicted in FIG. 2, the POT assistance system environment 200 may contain numerous user devices 204.

In some embodiments, the user module 222 allows a user 202 to access the POT assistance application. There are several ways in which the user module 222 may allow the user 202 to access the POT assistance application. In some embodiments, the user module 222 may interact with an NFC access token to allow the user 202 to access the POT assistance application. In this way, an NFC access token may interact with the user device 204 and be recognized by the user module 222. In turn, the user module 222 may then activate the POT assistance application on the user device 204. In other embodiments, the user module 222 may activate the POT assistance application on the user device 204 by user 202 gesture, touch, voice command, and/or the like. Furthermore, allowing access to the POT assistance application further allows for POT assistance application interfaces to be provided to the user device 204. The user module 222 may direct the POT assistance application interfaces to a screen associated with the user device 204. The POT assistance application interfaces are further illustrated below with respect to FIG. 5 and FIG. 6.

The user module 222 allows for communication between the user device 204 and the POT system 206 directly or indirectly with the mobile application server 208. This communication may allow for audio and/or visual indications as to the transaction, such that the user 202 may monitor the transaction. For example, the user module 222 may receive an indication from the POT system 206 that a product of a transaction is Product A, Cost A. The user module 222 may audibly indicate to the user 202 that he/she is purchasing "Product A at Cost A." In this way the user module 222 may audibly provide the user 202 with an indication as to each product and/or service that the user 202 is purchasing via the transaction. Furthermore, the user module 222 may provide a visual indication of the transaction, such that a user 202 may monitor the transaction. In this way, the user 202 may have a visual indication as to the products or services of a transaction. For example, if the user 202 purchases Product A at Cost A, it will be displayed on the display of the user device 204 to indication that the user 202 just purchased Product A at Cost A. This is further illustrated below with respect to the interfaces in FIG. 5 and FIG. 6.

The user module 222 may also allow a user 202 to utilize commands, such as gestures to control the process of the POT assistance application. In this way, the user module 222 may utilize commands to navigate through the transaction using commands. The commands may include, but are not limited to user 202 gestures, touching, and/or the like, such as those described in more detail with respect to FIG. 7a-7e.

Finally, the user module 222 allows for payment storage and selection. The user module 222 may allow the user 202 to store various payment devices, such as credit cards, debit cards, gift cards, checks, mobile wallets, and/or the like. In this way, the user module 222 allows for storage of payment devices in the in the memory device 216 of the user device 204. In this way, when a user 202 attempts to complete a transaction, the user module 222 may provide the user 202 with several payment options. The payment options may have been manually inputted into the user device 204 by the user 202 or the financial institution system 210 may have provided information regarding the user's 202 payment devices associated with that financial institution to the user device 204.

As further illustrated in FIG. 2, the financial institution systems 210 are operatively coupled to the mobile application server 208, the POT system 206, and the user device 204 through the network 201. The financial institution systems 210 have systems with devices the same or similar to the devices described for the mobile application server 208, the POT system 206, and/or the user device 204 (e.g., communication device, processing device, and memory device). Therefore, the financial institution systems 210 communicate with the mobile application server 208, the POT system 206, and/or the user device 204 in the same or similar way as previously described with respect to each system. The financial institution computer systems 210, in some embodiments, are comprised of systems and devices that allow the mobile application server 208 to access account information at the other financial institution and/or allow to access transactions the user 202 is currently entering into using accounts at the other financial institutions.

The financial institution systems 201 provide user 202 payment devices to the mobile application server 208, POT system 206, and the user device 204. Along with payment devices, the financial institution system 201 provides data associated with the payment devices, such as, but not limited to account numbers, PIN numbers, routing numbers, security numbers, expiration dates, dates of birth, and/or the like required to authorize and process a transaction. Furthermore, the financial institution systems 201 may authorize and process the selected payment device.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 3 illustrates a POT assistance application process 300, in accordance with one embodiment of the present invention. As illustrated in block 302 the POT assistance application may have been activated. The POT assistance application may have been activated in several ways, including, but not limited to the user device 204 receiving a command from the user 202, such as those commands illustrated below in FIG. 7a-7e. For example, a command may be the user device 202 recognizing an NFC access token to activate the POT assistance application. In another example, the user device 204 may activate the POT assistance application based on a user 202 communication or command, such as a user 202 provided gesture, voice command, text command, touch command, keypad command, and/or the like.

As illustrated in block 304, the system may then provide the user 202 with a POT authorization request. In this way, the user 202 may present the authorization request to the merchant and the merchant may confirm that the user 202 is wishing to enter into a transaction with the merchant. The authorization request, in some embodiments, may include an NFC token, voice, text, touch (such as mat), and/or the like authorization request. The authorization request, in some embodiments, may include a touch of the user device 204 to a device or surface associated with the merchant, such as a mat. The mat may identify the user device 204 and subsequently authentication a communication between the merchant and the user 202 using the system. The authorization request, in some embodiments, comprises a unique code identification that the merchant POT is able to identify. Unique code identifications may include various universal product codes (UPC codes), numbers associated with a UPC code, QR codes, and/or the like. In this way, the user 202 may present the unique code identification to the merchant and the merchant may input the code into the POT system 206 to confirm that the user 202 is at a POT and wishing to start a transaction with the merchant. Next, as illustrated in block 306 the system may receive the completed request from the POT. In this way, the system now knows the user 202 is located at a POT for a merchant and that the user 202 is initiating a transaction with the merchant. Furthermore, the system now knows which merchant to communicate with during the transaction and provides a communication link between the user, merchant, and the system.

Once the authorization request has been completed, as illustrated in block 306, the system may receive communications from the POT, as illustrated in block 308. Once the system receives the communications, the communications may be provided to the user device 204 in real-time, as illustrated in block 310. The communications, in some embodiments, may be directly presented to the user 202 via the user device 204. In other embodiments, the communications may be indirectly presented to the user 202, such that the communications may be provided to the system prior to the user 202 receiving the communication. The communication allows for the terms of the transaction and/or the transaction itself to be communicated to the user 202. The communication of the transaction to the user 202 may include audio and/or visual indications as to the transaction, such that the user 202 may monitor the transaction. For example, if the user 202 is purchasing several items at a grocery store, each time a product is scanned at the grocery store's POT, the system may communicate either directly or indirectly with the user device 204 to allow the user device 204 to either audibly and/or visually provide the user 202 with an indication as to the type and price of each product that is scanned during the transaction. In another example, the communication may indicate products purchased that were or were not on a smart list pre-determined by the user 202. In another example, the communication may indicate products that were on the smart list but were not purchased by the user 202. In yet another example, differences in price for a product from a smart list compared to the product being purchased may be communicated to the user 202. In this way, the user 202 may be notified when a price is higher or lower than he/she has previously paid for the same product.

By providing communications to the user device 204, as illustrated in block 310, the system may allow the user 202 to flag communication segments, as illustrated in block 311. The system, as illustrated in block 312, may then receive flagged communication segments from the user 202 and provide an indication to the merchant that the user 202 has flagged that particular communication segment. Flagging specific communication segments allows a user 202 to discuss with the merchant a portion of the transaction. For example, if the user 202 has a question regarding the price of a particular product purchases out of a plurality of products purchased, the user 202 may flag that product to discuss with the merchant at the end of the transaction. Flagging a segment of the communication may be done in several ways, including but not limited to, voice flagging, gesture flagging, touch flagging, and/or other means of a user 202 notifying the system that the communication segment has been flagged for later review.

Once the transaction has been completed and all flagged communication segments have been discussed and reviewed, the system may provide the user 202 with the payment options available to the user 202 for that transaction, as illustrated in block 314. The available payment options include any payment device that the user 202 may be able to utilize, that the merchant may also accept. In this way, the payment options available to the user 202 may be limited by what payment devices the user 202 has enrolled in and what payment devices the merchant of the transaction may accept. The payment devices available to the user 202 include, but may not be limited to credit cards, debit cards, cash, mobile wallet, checks, lines-of-credit, etc. The payment devices may be determined by the system based on either manual input of the payment device by the user 202 or payment devices provided by a financial institution associated with the user 202.

The system may then receive a selected payment device from the payment options that the user 202 wishes to utilize to provide payment for the current transaction, as illustrated in block 316. The system may receive the selected payment device and authorize payment for the transaction using that payment device with the financial institution associated with the payment device. Once authorized, the system may communicate the selected payment device to the POT of the merchant, as illustrated in block 318, such that the transaction may be completed. Completing the transaction may require the user to sign for the transaction. However, the user 202 may be able to provide an NFC token, voice, text, and or the like to complete the transaction. Upon completion of the transaction the system may provide a POT assistance application termination notification. The termination notification will notify the user 202 when the transaction is complete and the POT assistance application has been terminated. The termination notification may be an audio and/or video notification that the POT assistance application is terminated.

FIG. 4 illustrates a process map of a POT assistance application user process 400, in accordance with one embodiment of the present invention. As illustrated in decision block 402, the user 202 may determine whether to activate the POT assistance application. If the user 202 determines not to activate the POT assistance application, the POT assistance application user process 400 may be terminated. If the POT assistance application is activated by the user 202, via NFC access token or the like, the user 202 may receive the user device home screen 602, as illustrated in FIG. 5. FIG. 5 illustrates a user mobile device interface process 600, in accordance with one embodiment of the present invention.

As illustrated in FIG. 4, once the POT assistance application has been activated in decision block 402, the user receives an authorization request through the user device 204. In this way, the authorization request ensures that the user 202 is located near a POT and is wishing to begin a transaction with the merchant associated with the POT. In some embodiments, the user system 204 may be touched to a location on the POT system 206, such that the system may then know that a user 202 is wishing to transact with the merchant. In other embodiments, the user system 204 may provide a unique code identification that may require the user 202 to present the unique code identification, NFC token, and/or the like to the merchant. For example, as illustrated in FIG. 5, a UPC code 604 may be presented on the user device 204 for presentment to the merchant. As illustrated in decision block 406 of FIG. 4, the user 202 may decide to pair the user device 204 to the POT system 206, thus presenting the unique code identification to the merchant. Again, if the user 202 decides not to pair his/her user device 204 with the POT system 206, the POT assistance application user process 400 may be terminated. If the user 202 does pair his/her user device 204 to the POT system 206, the unique code identification may be presented to the merchant. In the example illustrated in FIG. 5, a UPC code 604 may be presented to the merchant. The merchant may then scan the UPC code on the user device 204 using the POT system 206. Once the POT system 206 has scanned the UPC code, the authorization request has been completed and confirms that the user 202 is in communication with a merchant and is wishing to transact with that merchant.

Referring back to FIG. 4, as illustrated in block 408, as the products are being scanned at the POT, the user 202 may receive real-time communications regarding the products, at the user device 204. In some embodiments, the user 202 may receive an audio indication as to each product that is being scanned. In some embodiments, the user 202 may receive an audio indication as to the product being scanned associating with a pre-determined smart list. In yet other embodiments, the user 202 may receive an audio indication as to the products being scanned associated with products that are not on a pre-determined list established by the user 202. In still other embodiments, the user 202 may receive an audio indication as to a price difference between a product previously purchased that is on the smart list and a product that is currently being purchased. In this way, the user 202 may be notified when he/she is paying more or less for a product than he/she has in the past. The audio indication may include the product name, price of the product, and a running total for the products purchased. In some embodiments, as illustrated in FIG. 5 an item list 603 may provide a user 202 with visual indications as to the products that are being scanned. As illustrated in the item list 603, in this example, the user 202 has purchased fruit at $ X.XX and mean at $ X.XX for a total of $ X.XX. Although the system may provide audio indicating the user 202 purchased fruit for $ X.XX, the system may also provide that information on the user device 204.

While the products are being scanned and the product and price is being communicated to the user 202 audible and visually via the user device 204, the user 202 may, as illustrated in decision block 410 of FIG. 4 flag a segment of the communication by providing a command. If the user 202 decides to flag a segment of the communication in decision block 410, the communication will be flagged by the system such that the user 202 may discuss the flagged communication segment with the merchant, as illustrated in block 412. For example, the user 202 may flag a communication segment associated with a particular product out of a plurality of products purchased, to discuss the purchase, price, product, etc. with the merchant at the end of the transaction. Flagging a segment of the communication of the transaction to a user device 204 may be done in several ways, including but not limited to, voice flagging, gesture flagging, touch flagging, and/or other means of a user 202 notifying a user device 204 that the communication segment has been flagged for later review.

Once the discussion of the flagged communication has concluded in block 412 or the user 202 did not flag a communication segment in decision block 410, the user 202 may then receive a total for the products of the transaction, as illustrated in block 414. The total may be provided via an interface on the user device 204, such as the final total 612 illustrated in FIG. 5. The final total 612 includes the total for the transaction with the merchant, including tax, any other fees associated with the purchase, and the user's 202 loyalty card information that may have been automatically provided to the merchant during the transaction. The final total 612 may also indicate the payment device selected by the user 202. As illustrated in block 416 of FIG. 4, the user 202 may select a payment device from the payment options available to the user 202. The user 202 may make the selection by using commands, such as gestures, voice commands, text commands, mouse commands, keystroke commands, touch commands, and/or the like. As illustrated in FIG. 5, the payment options 610 interface allows a user 202 to select from the variety of payment devices available. The available payment options include any payment device that the user 202 may be able to utilize, that the merchant may also accept. In this way, the payment options available to the user 202 may be limited by what payment devices the user 202 has enrolled in and what payment devices the merchant of the transaction may accept. The payment devices available to the user 202 include, but may not be limited to credit cards, debit cards, cash, mobile wallet, checks, lines-of-credit, etc.

The payment options 610 may be provided to the user 202 audibly, such that the user 202 may scroll through his/her payment options and at each option the user device 204 may audibly indication the option. For example, if the user 202 scrolls through the credit cards the user 202 has available, the user system 204 may audibly indicate to the user 202 which credit card has been selected, such as "Credit Card 1." In some embodiments, the user 202 may have previously selected a default payment device, such that when a user 202 enters a transaction, that payment device is the default payment device for all transactions using the POT assistance application. In other embodiments, the user 202 may select the payment device he/she wishes to utilize for that specific transaction, as described above.

Once the user 202 has select a payment device for the transaction, as illustrated in block 416 and the transaction has been completed, the system may provide the user 202 with a receipt for the transaction, as illustrated in block 418. The receipt for the transaction may be in the form of a traditional paper receipt, an electronic receipt, etc. For example, as illustrated in FIG. 5, the receipt 614 may be provided via an interface on the user device 204. Once the transaction is complete and the receipt is stored, the system may provide a termination notification to the user 202 such that the user 202 may know that the transaction is complete and the POT assistance application has been terminated. The termination notification may be an audio, voice, touch/feel, and/or the like notification to let the user 202 know that the transaction has been completed and the POT assistance application has been closed.

FIG. 6 illustrates a user device interface menu 700, in accordance with one embodiment of the present invention.

The POT assistance application may be navigated to provide the functions described herein. The menu 702 of the POT assistance application may aid the user 202 in customizing his/her POT assistance application experience. The menu 702 allows a user 202 to select from several option interfaces, including smart lists 704, receipts 706, settings 708, and/or manage payment options 710. The menu 702 has only four interface options, in order to make navigation simpler. The smart list 704 is generated by previous purchase history and/or previous purchase patterns. In this way, the smart list 704 acts as a shopping list based on the user's 202 transaction history. For example, if a user 202 has previously purchased Brand A laundry detergent every other week. The smart list 704 may include Brand A laundry detergent on the user's 202 list if it is the proper week. The smart list 704 is intended to provide users 202 with suggestions, recommendations, and assistance with creating a shopping list. The smart list 704 also allows a user 202 to input manually products that he/she wishes to purchase during the next transaction with a merchant. These inputted products may be products that the user 202 purchased previously and/or new products not previously purchased by the user 202.

Another option interface includes the receipts 706 interface. The receipts 706 interface provides a list of the user's 202 previous receipts. Each receipt may be archived automatically upon completion of a transaction, such that the user 202 may have access to the archived receipts for future reference. In this way, the user 202 does not need to keep hard copies of receipts. As illustrated in the receipts 706 interface, the user 203, in this example, has four receipts archived, from four separate stores Store 1, Store 2, Store 3, and Store 4, the user 202 may select the receipt and the system will provide the user 202 a copy of the full receipt.

In some embodiments, an options interface may include a settings 708 interface. The settings 708 interface provides for toggling on or off speech feedback and motion gestures. Furthermore, the speed of the speech and screen may be adjusted. Furthermore, the POT assistance application allows for the user 202 to add loyalty cards, such as those for retail or grocery stores. In this way, the system may allow a user 202 to input loyalty cards in the same or similar way as described above with respect to payment options. The loyalty card may be utilized for any transaction at the merchant that provides the loyalty card. In this way, the loyalty card may be automatically applied to the transaction without requiring the user 202 to present the loyalty card to the merchant.

In some embodiments, an options interface may include manage payment options 710 interface. The manage payment options 710 allows users 202 to audible or visually be notified of the payment devices the user has available for the POT assistance application. The manage payment options 710 interface allows a user 202 to manually add and/or delete payment devices to the POT assistance application. In some embodiments, the user 202 may manually input information regarding the payment devices into the user device 204 such that the user 202 may utilize the payment device for a future transaction. In other embodiments, the payment device may be NFC capable. In this way, the user 202 may touch the payment device to the user device 204 and subsequently the user device 204 may automatically receive the information associated with the payment device such that the user 202 may utilize the payment device for a future transaction.

FIG. 7a-7e illustrates various user commands associated with the POT assistance application, in accordance with one embodiment of the present invention. The user 202 commands that have been described above with respect to the user 202 utilizing and navigating the processes associated with the POT assistance application and system are further described herein with respect to FIGS. 7a-7e. One of ordinary skill in the art will appreciate that these commands represent only some embodiments of the potential commands that may be recognized by the POT assistance system. These commands are described only to provide examples as to the types of commands that may be utilized and are not meant to limit the possible commands a user 202 may utilize to navigation the processes associated with the POT assistance application and system. In this way, any commands that may provide selection or advancement within the steps of an application may be utilized.

Figure 7A:
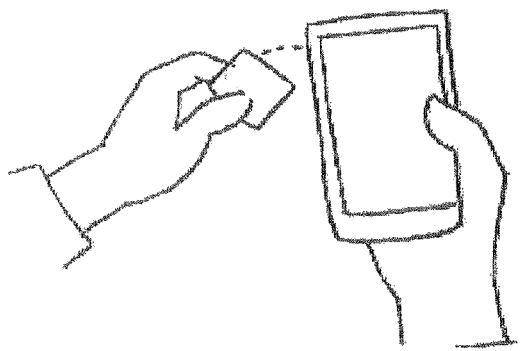
Figure 7B:
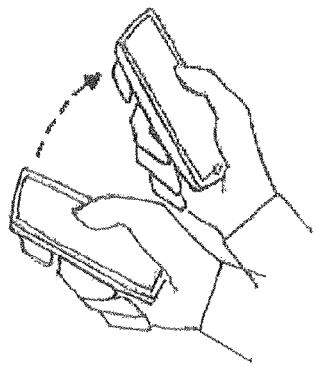
Figure 7C:
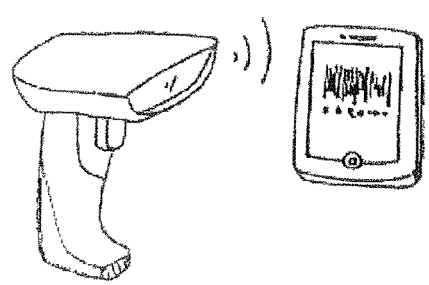

FIG. 7a represents an NFC access token command. In some embodiments, the user 202 may use this command may be used to navigate any aspect of the POT assistance application. In other embodiments the NFC access token command may be used by the user 202 to initiate the POT assistance application by touching the NFC token to the user device 204. FIG. 7b illustrates a gesture that may be made to the user device 204 to navigate the POT assistance application. In this gesture, the user device 204 may be quickly tilted towards the user 202 or quickly tilted away from the user 202. In some embodiments, the gesture illustrated in FIG. 7b may be used to access the payment types and to change payment types for a transaction. In other embodiments, the gesture illustrated in FIG. 7b may be used for any other navigation means required for utilizing the POT assistance application. FIG. 7c represents a command of pairing the user device 204 with the POT system 206. In this way, the user 202 may hold the user device 204 with screen out, towards the merchant. The merchant may then scan it with a standard UPC or barcode reader to begin an encrypted connection between the user device 204 and the POT system 206. The barcode or UPC holds address information to being the linking of the user device 204 with the system.

Figure 7D:
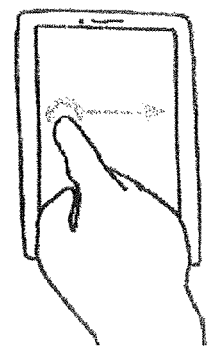
Figure 7E:
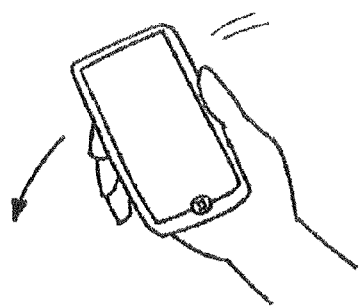

FIG. 7d provides a touch or swipe command. In this way, a user 202 may be able to navigate the POT assistance application by touching or swiping the user device 204. In this way, the user 202 may be able to navigate between interfaces of the POT assistance application. In some embodiments, the user 202 may use this gesture to navigate any aspect of the POT assistance application. In some embodiments, the user 202 may swipe the user device 204 to change the selected payment device. FIG. 7e provides a second gesture command. This gesture command allows a user to navigate interfaces of the POT assistance application by tilting the user device 204 from side to side to navigate the POT assistance application. In some embodiments, the user 202 may use this gesture to navigate any aspect of the POT assistance application. In some embodiments, the user 202 may access the subtotal amount by using this second gesture.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for assisting a user at a point-of-transaction, the method comprising:
    receiving an indication that the user is initiating a transaction at a point-of-transaction device, wherein the indication is received from a mobile device associated with the user; activating a mobile application that is present on the mobile device prior to initiating the transaction, wherein the mobile application is activated by recognizing that the user is at or near the point-of-transaction device;
    providing an authorization request to the mobile device, wherein the authorization request is recognizable by a point-of-transaction device at the point-of-transaction;
    confirming authorization based on an indication that the authorization request was presented and recognized by the point-of-transaction device, wherein presenting and recognizing the authorization request includes pairing the mobile device with the point-of-transaction device;
    linking the mobile application with the point-of-transaction device, wherein the linking is based at least in part on the confirmed authorization, and wherein the linking of the mobile application with the point-of-transaction further comprises communicably linking the mobile device and the point-of-transaction device;
    communicating, via a computing device processor, the transaction to the user, wherein the communication is provided to the user through the mobile application such that the user receives an audio communication of information associated with each product of the transaction in real-time during the transaction, wherein the information associated with each product includes a name of the product and a price of the product, wherein the communication further provides an audible notification of the initiation and completion of the transaction;
    allowing communication segments of the audio communication to be flagged for later review by the user via the mobile device wherein each communication segment correlates to the audio communication of information associated with one product of the transaction, wherein allowing communication segments to be flagged further comprises allowing the user to flag segments of the communication of a transaction for further investigation of the product associated with that segment of the communication, wherein the communication segment is flagged to allow the user and merchant to review the one product of the transaction associated with that communication segment to confirm a price and type of product prior to completing the transaction;

providing an audio communication of a subtotal for the transaction at one or more points during the transaction;

providing a plurality of payment options to the user for payment for the transaction, wherein the plurality of payment options are presented to the user via the mobile device;

allowing providing or silencing of the audio communication of information associated with each product of the transaction, allowing flagging of communication segments, and allowing audio communications of subtotals for the transaction at one or more points during the transaction based on a different user gesture to control each function, wherein the user gesture is a directional movement of the mobile device; and providing an indication that the transaction has been completed using one of the plurality of payment options provided to the user.

2. The method of claim 1, wherein receiving an indication that the user is initiating a transaction using the mobile device further comprises receiving a near-field communication to activate a mobile application.

3. The method of claim 2, wherein activating the mobile application via near-field communication is based on a near-field communication access token initiating the activation.

4. The method of claim 1, wherein providing the authorization request further comprises providing a barcode to the mobile device, wherein the barcode is scanned at the point-of-transaction to confirm authorization.

5. The method of claim 1 further comprising providing a selected payment device from the plurality of payment options to the point-of-transaction to complete the transaction.

6. The method of claim 1 further comprising allowing the user to navigate the mobile application using command gestures.

7. A system for assisting a user at a point-of-transaction, the system comprising:
a memory device;
a communication device; and
a processing device operatively coupled to the memory device and the communication device, wherein the processing device is configured to execute computer-readable program code to:
receive an indication that the user is initiating a transaction at a point-of-transaction device, wherein the indication is received from a mobile device associated with the user;
activate a mobile application that is present on the mobile device prior to initiating the transaction, wherein the mobile application is activated by recognizing that the user is at or near the point-of-transaction device;
provide an authorization request to the mobile device, wherein the authorization request is recognizable by a point-of-transaction device at the point-of-transaction;
confirming authorization based on the authorization request being presented and recognized by the point-of-transaction device, wherein presenting and recognizing the authorization request includes pairing the mobile device with the point-of-transaction device;
link the mobile application with the point-of-transaction device, wherein the linking is based at least in part on the confirmed authorization, and wherein the linking of the mobile application with the point-of-transaction further comprises communicably linking the mobile device and the point-of-transaction device;
communicate the transaction to the user, wherein the communication is provided to the user through the mobile application such that the user receives an audio communication of information associated with each product of the transaction in real-time during the transaction, wherein the information associated with each product includes a name of the product and a price of the product, wherein the communication further provides an audible notification of the initiation and completion of the transaction;
allow communication segments of the audio communication to be flagged for later review by the user via the mobile device wherein each communication segment correlates to the audio communication of information associated with one product of the transaction, wherein allowing communication segments to be flagged further comprises allowing the user to flag segments of the communication of a transaction for further investigation of the product associated with that segment of the communication, wherein the communication segment is flagged to allow the user and merchant to review the one product of the transaction associated with that communication segment to confirm a price and type of product prior to completing the transaction;
provide an audio communication of a subtotal for the transaction at one or more points during the transaction;
provide a plurality of payment options to the user to select for payment for the transaction via the mobile device;
allow providing or silencing of the audio communication of information associated with each product of the transaction, allowing flagging of communication segments, and allowing audio communications of subtotals for the transaction at one or more points during the transaction based on a different user gesture to control each function, wherein the user gesture is a directional movement of the mobile device; and
provide the user a confirmation that the transaction has been completed using the user selection payment option.

8. The system of claim 7, wherein receiving an indication that the user is initiating a transaction using the mobile device further comprises receiving a near-field communication to activate a mobile application.

9. The system of claim 8, wherein activating the mobile application via near-field communication is based on a near-field communication access token initiating the activation.

10. The system of claim 7, wherein providing the authorization request further comprises providing a barcode to the mobile device, wherein the barcode is scanned at the point-of-transaction to confirm authorization.

11. The system of claim 7, wherein the processing device is further configured to provide a selected payment device from the plurality of payment options to the point-of-transaction to complete the transaction.

12. The system of claim 7, wherein the processing device is further configured to allow the user to navigate the mobile application using command gestures.

13. A computer program product for assisting a user at a point-of-transaction, the computer program product comprising at least one non-transitory computer-readable medium having computer-readable program code portions embodied therein, the computer-readable program code portions comprising:

an executable portion configured for receiving an indication that the user is initiating a transaction at a point-of-transaction device, wherein the indication is received from a mobile device associated with the user;

an executable portion configured for activating a mobile application that is present on the mobile device prior to initiating the transaction, wherein the mobile application is activated by recognizing that the user is at or near the point-of-transaction device;

an executable portion configured for providing an authorization request to the mobile device, wherein the authorization request is recognizable by a point-of-transaction device at the point-of-transaction;

an executable portion configured for confirming authorization based on the authorization request being presented and recognized by the point-of-transaction device, wherein presenting and recognizing the authorization request includes pairing the mobile device with the point-of-transaction device;

an executable portion configured for linking the mobile application with the point-of-transaction device, wherein the linking is based at least in part on the confirmed authorization, and wherein the linking of the mobile application with the point-of-transaction further comprises communicably linking the mobile device and the point-of-transaction device;

an executable portion configured for communicating the transaction to the user, wherein the communication is provided to the user through the mobile application such that the user receives an audio communication of information associated with each product of the transaction in real-time during the transaction, wherein the information associated with each product includes a name of the product and a price of the product, wherein the communication further provides an audible notification of the initiation and completion of the transaction;

an executable portion configured for allowing communication segments of the audio communication to be flagged for later review by the user via the mobile device wherein each communication segment correlates to the audio communication of information associated with one product of the transaction, wherein allowing communication segments to be flagged further comprises allowing the user to flag segments of the communication of a transaction for further investigation of the product associated with that segment of the communication, wherein the communication segment is flagged to allow the user and merchant to review the one product of the transaction associated with that communication segment to confirm a price and type of product prior to completing the transaction;

an executable portion configured for providing an audio communication of a subtotal for the transaction at one or more points during the transaction;

an executable portion configured for providing a plurality of payment options to the user to select for payment for the transaction via the mobile device;

an executable portion configured for allowing providing or silencing of the audio communication of information associated with each product of the transaction, allowing flagging of communication segments, and allowing audio communications of subtotals for the transaction at one or more points during the transaction based on a different user gesture to control each function, wherein the user gesture is a directional movement of the mobile device; and an executable portion configured for providing the user a confirmation that the transaction has been completed using the user selection payment option.

14. The computer program product of claim 13, wherein receiving an indication that the user is initiating a transaction using the mobile device further comprises receiving a near-field communication to activate a mobile application.

15. The computer program product of claim 14, wherein activating the mobile application via near-field communication is based on a near-field communication access token initiating the activation.

16. The computer program product of claim 13, wherein providing the authorization request further comprises providing a barcode to the mobile device, wherein the barcode is scanned at the point-of-transaction to confirm authorization.

17. The computer program product of claim 13, wherein the computer-readable program code portions further comprises an executable portion for providing a selected payment device from the plurality of payment options to the point-of-transaction to complete the transaction.

18. The computer program product of claim 13, wherein the computer-readable program code portions further comprises an executable portion for allowing the user to navigate the mobile application using command gestures.

* * * * *